I. H. RANDALL.
CAR-WHEEL AND AXLE.
No. 194,950. Patented Sept. 4, 1877.
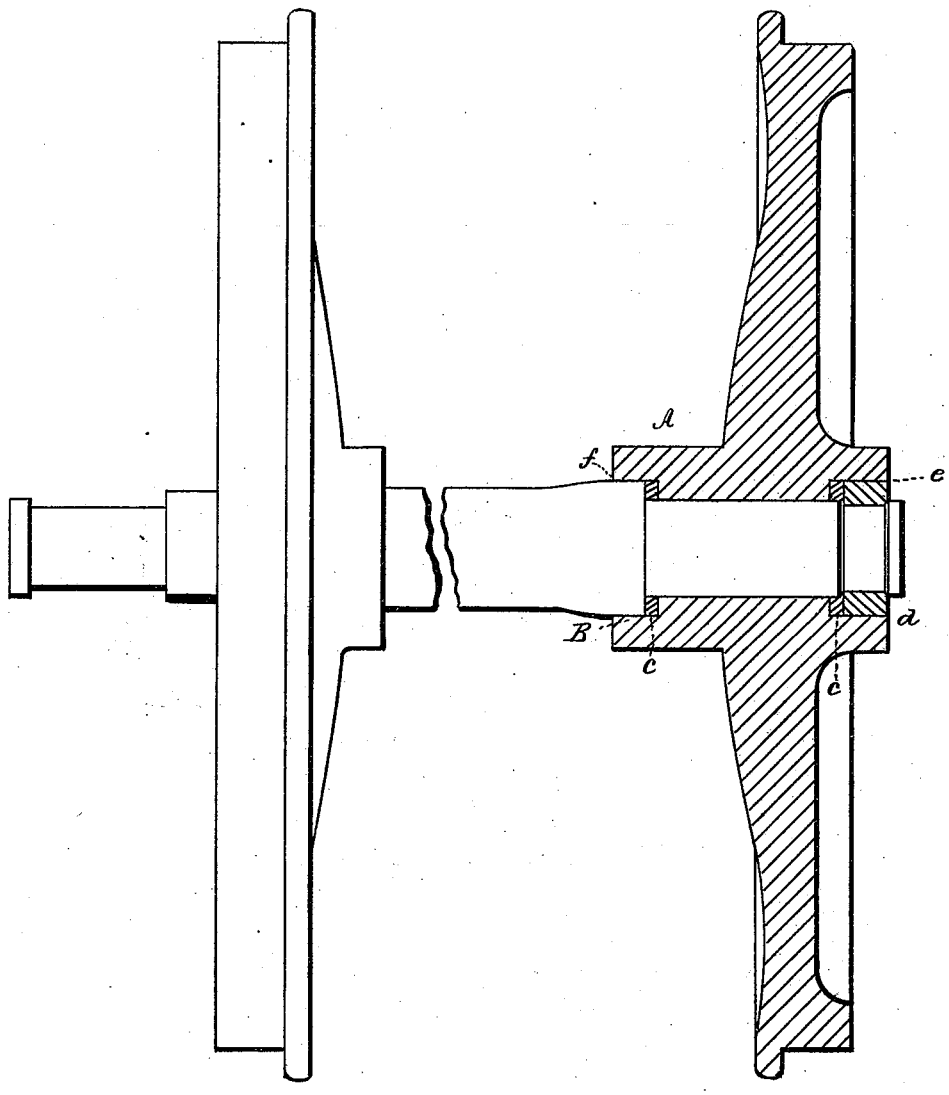

UNITED STATES PATENT OFFICE.

ISAAC H. RANDALL, OF BOSTON, MASSACHUSETTS.

IMPROVEMENT IN CAR WHEELS AND AXLES.

Specification forming part of Letters Patent No. 194,950, dated September 4, 1877; application filed March 28, 1877.

*To all whom it may concern:*

Be it known that I, ISAAC H. RANDALL, of Boston, in the county of Suffolk and Commonwealth of Massachusetts, have invented a new and useful Improvement in Railroad-Car Wheels and Axles, which is fully set forth in the following specification and accompanying drawing.

The object of my invention is to prevent the wear and tear and friction of railroad trucks, wheels, and rails in passing around short curves.

I am aware that the use of loose wheels on railroad-trucks is not new, many different plans for using them having been devised, and some patented and experimented with; but, so far as I am aware, none have been found to answer in practical use.

My invention obviates the difficulties which have prevented previous devices from becoming useful, and it is easily applied to old axles in use.

I use one loose wheel on each axle. I make the wheel in the usual form, except the hub, which is elongated on the inner side about a foot. On new axles a shoulder is forged at sufficient distance from the end of the axle, which is to receive the loose wheel to correspond with the elongated inner end of the hub; and on old axles I cut a slight depression in the axle—say, one-thirty-second of an inch—at the point where the shoulder is to be, and shrink on an iron collar or ring of suitable thickness and width to make the desired shoulder.

The inner end of the hub is chambered to receive a collar, *c*, and to cover the shoulder on the axle B, to keep out dirt. The collars *c* are loose and free to move, the purpose of them being to prevent wear on the hub and axle.

The hub is nicely bored out, and the axle turned and finished to fit the bore of the hub. The outer end of the hub is chambered to receive the loose collar *c* and the fixed collar *d*, which holds the wheel on the axle. This collar *d* may be put on the axle with a screw-thread; but I do not use that method, but, instead, make a slight depression in the axle where it is to be placed, and bore out the collar of such inner diameter that when heated to red heat it can be forced readily to its place, and when cold it will shrink into the depression made on the axle to receive it with such firmness that it cannot be displaced, and will securely retain the loose wheel on the axle.

Holes bored in the hub of the loose wheel serve to admit oil to lubricate the axle and inner surface of the hub. These holes will be securely stopped after putting in the oil.

In all other respects the wheel and axle are in the usual form; and my invention can be readily adapted to trucks now in use on cars, the loose wheels being made from present patterns by elongating the hub on the inner side of the wheel, and altering the axle by fitting the collars and finishing in the manner before described.

On a straight track a wheel thus fitted and secured revolves with the other wheels of the truck; but on a curve the loose wheel will accommodate its motion to the increased or decreased length of rail it has to traverse, revolving faster or slower than the fixed wheels on the other end of the axles, as the case may require, thus obviating the wear caused by dragging one wheel on the track, as is the case where both wheels are fixed on the axle when passing short curves.

It is obvious that both wheels on an axle may be fitted in the same manner, when it is desirable to do so; but generally all the useful results may be attained by fitting one wheel in this manner.

The advantages gained by the use of my invention will probably be greater on horse-railroads in the streets, where short curves around corners are frequent, and heavy loads must be often carried without the means of increasing the power.

I claim as new and my invention—

In a railroad-car truck in combination, an axle with a shoulder to meet the inner end of the wheel-hub, a turned bearing for the wheel, a groove turned in the axle at the outer end of the wheel-hub, a car-wheel properly bored and finished to go on the axle between the shoulder and the groove and turn on the axle, a collar bored to fit exactly to the axle in the groove, and to be placed in the groove when expanded by heat, and locked by the contraction of the metal when cooled, made and arranged with reference to each other, as, or substantially as, described, and for the purpose specified.

ISAAC H. RANDALL.

Witnesses:
 SIMEON A. SMITH,
 CHS. HOUGHTON.